(12) United States Patent
Okumura et al.

(10) Patent No.: US 11,529,730 B2
(45) Date of Patent: Dec. 20, 2022

(54) ROBOT SYSTEM

(71) Applicant: NIDEC SANKYO CORPORATION, Nagano (JP)

(72) Inventors: Hirokatsu Okumura, Nagano (JP); Jun Otsuji, Nagano (JP); Tetsuya Inomata, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 222 days.

(21) Appl. No.: 16/859,087

(22) Filed: Apr. 27, 2020

(65) Prior Publication Data

US 2020/0338721 A1    Oct. 29, 2020

(30) Foreign Application Priority Data

Apr. 26, 2019    (JP) .............................. JP2019-085664

(51) Int. Cl.
| | |
|---|---|
| *B25J 9/16* | (2006.01) |
| *B25J 9/08* | (2006.01) |
| *G05B 19/408* | (2006.01) |

(52) U.S. Cl.
CPC .............. *B25J 9/08* (2013.01); *B25J 9/1605* (2013.01); *G05B 19/4083* (2013.01); *G05B 2219/35155* (2013.01); *G05B 2219/50391* (2013.01)

(58) Field of Classification Search
CPC . B25J 15/04; B25J 15/0483; B25J 9/08; B25J 9/1605; G05B 2219/40009;

(Continued)

(56) References Cited

U.S. PATENT DOCUMENTS

| | | | |
|---|---|---|---|
| 9,320,642 B1* | 4/2016 | Van Oudenallen | .... G16H 20/40 |
| 2004/0128029 A1* | 7/2004 | Kato | .......................... B25J 9/08 |
| | | | 700/245 |

(Continued)

FOREIGN PATENT DOCUMENTS

| | | |
|---|---|---|
| JP | 2001242922 A | 9/2001 |
| JP | 2004148433 A | 5/2004 |

(Continued)

*Primary Examiner* — Khoi H Tran
*Assistant Examiner* — Tanner L Cullen
(74) *Attorney, Agent, or Firm* — Cantor Colburn LLP

(57) ABSTRACT

A robot system includes a robot controller and an object robot including a first storage part storing a hardware identifier, individual discrimination data, and device specific data including an individual difference parameter. The same hardware identifier is assigned to the object robot having the same mechanism. The robot controller includes a second storage part storing common configuration information corresponding to the hardware identifier and the individual discrimination data and the individual difference parameter of the object robot, and a control part configured, in a case that the hardware identifier corresponding to the common configuration information stored in the second storage part and the hardware identifier assigned to the object robot are collated and matched with each other, to create hardware definition information of the object robot based on the common configuration information stored in the second storage part and the individual difference parameter read from the first storage part.

8 Claims, 9 Drawing Sheets

(58) Field of Classification Search
CPC ........... G05B 2219/35155; G05B 2219/40304; G05B 2219/33105; G05B 19/4083; G05B 2219/50391

See application file for complete search history.

(56) References Cited

U.S. PATENT DOCUMENTS

| | | | |
|---|---|---|---|
| 2016/0214257 A1* | 7/2016 | Sejimo | .................... B25J 9/1674 |
| 2016/0346044 A1* | 12/2016 | Brown | ................ A61B 17/1764 |
| 2017/0057085 A1* | 3/2017 | Cookson | ................ B25J 9/1646 |
| 2018/0311831 A1* | 11/2018 | Guerin | ................. B25J 15/0483 |
| 2022/0219326 A1* | 7/2022 | Riek | ....................... B25J 9/1664 |

FOREIGN PATENT DOCUMENTS

| | | | |
|---|---|---|---|
| JP | 2013056378 A | 3/2013 |
| JP | 2016137526 A | 8/2016 |

* cited by examiner

| Robot Type at Shipment | Task Number 1 | | | Task Number 2 | | Task Number 3 | | ... |
|---|---|---|---|---|---|---|---|---|
| | HW Group ID | Robot Type of Manipulator | Robot Type of Hand | HW Group ID | Robot Type of Aligner | HW Group ID | Robot Type | ... |
| AA243-01 | 111 | 7400-506 | 16230 | 222 | 1D-406 | — | — | ... |
| AA243-04 | 111 | 7400-510 | 16231 | 222 | 1D-406 | — | — | ... |
| AA243-00 | 111 | 7400-510 | 16353 | 222 | 1D-406 | — | — | ... |
| AA243-08 | 111 | 7400-506 | 16230 | — | — | — | — | ... |
| AA240-42 | 111 | 7400-510 | 16231 | — | — | — | — | ... |
| AA240-45 | 111 | 7400-510 | 16353 | — | — | — | — | ... |
| AA243-12 | 333 | 4100-508 | 16353 | 222 | 1D-406 | — | — | ... |
| AA240-44 | 333 | 4100-508 | 16353 | — | — | — | — | ... |
| ⋮ | ⋮ | ⋮ | ⋮ | ⋮ | ⋮ | ⋮ | ⋮ | ⋮ |

FIG. 10

ROBOT SYSTEM

CROSS REFERENCE TO RELATED APPLICATION

The present application claims priority under 35 U.S.C. § 119 to Japanese Application No. 2019-085664 filed on Apr. 26, 2019, and the entire content of which is incorporated herein by reference.

TECHNICAL FIELD

The present invention relates to a robot system including at least a robot main body and a robot controller configured to control the robot main body.

BACKGROUND

A robot system is commonly structured of a manipulator including arms which are connected with each other and a motor which drives their connected parts, a hand or a tool which is attached to the manipulator, and a robot controller configured to control the manipulator and the hand. The manipulator and the hand structure a robot main body. In a robot in which a hand is unable to be detached from a manipulator, it may be considered that the hand is included in the manipulator and, in this case, a robot main body may be structured of only a manipulator. In order to control rotation of each of motors arranged in an inside of a robot main body by a robot controller, a motor is attached with an encoder for detecting its rotation position, and information of the rotation position acquired by the encoder is transmitted to the robot controller as needed. In some cases, a robot system may include an attachment which is independent of the robot main body. An aligner for changing a posture of a work which is an object to be processed of a robot main body or the like is also an attachment. An attachment is also an object to be controlled by a robot controller.

In a manipulator and a hand which are a robot main body, the number and dimensions of arms and hands, their connected relationships, specifications of a motor to be mounted are different for each model of a robot. Structural information of each of these robots is commonly stored in a robot controller in advance and thus, the robot controller is prepared for each model of the robot. The robot controller is unable to control a robot of another model which is different from its objected model as it is. In order to control a robot of another model by using a robot controller for a certain model, it is required that an operator inspects a model of the robot and performs an operation of replacing information of the robot controller with robot structural information adapted to the confirmed model. Therefore, a robot controller is prepared for each model of a robot. In addition, even in robots of the same model, an individual difference is existed for each robot main body and thus, when a robot is to be controlled by a robot controller, control corresponding to the individual difference is required to be performed. An individual difference is, for example, an offset value with respect to a home position. A manipulator and a hand are determined with a home position which indicates a reference posture for the operation. Rotation position data indicated by an encoder of a motor when located at the home position indicate a different value for each individual of a manipulator and a hand due to variation of attachment of the motor and the encoder. This is similar in a case of an attachment having a motor. Therefore, an individual difference is measured when assembling of a robot has been completed or the like, and after that, data of the individual difference are stored in a storage part of a robot controller. As a result, even in a robot controller for a robot main body of the same model, when another robot main body of the same model is replaced and connected, control is unable to be performed with a high degree of accuracy and readjustment of the robot controller is required. Therefore, it is not easy that a robot main body of the same model is replaced and connected.

However, in a case that a robot is to be used, in order to enhance efficiency in an operation in which a robot is used and, in order to flexibly cope with a change of a process and occurrence of trouble, there is a demand that a robot controller for the same model is replaced and connected to a robot main body of the same model. In addition, there is a case that, although the model is different, they may be regarded as the same model from a viewpoint of a structure and control of a robot main body. For example, there may be regarded as a different model based on whether an aligner which is an attachment is added to the robot main body or not. In a case that an operation without using an aligner is executed by a robot main body, the operation may be executed by using the same robot controller even if the model is different. In addition, there may be a case that, although the mechanism is completely the same, a robot main body in which epoxy paint is used as paint on an exterior of a manipulator on the premise of use in a clean room is determined to be a different model from a robot main body in which general paint is used without considering use in a clean room. In this case, although robot main bodies are referred to be different models, it is desirable that the same robot controller can be replaced and connected.

As an attempt capable of replacing a robot main body which is to be connected with a robot controller, Japanese Patent Laid-Open No. 2001-242922 (Patent Literature 1) discloses a robot system which is capable of being controlled by a robot controller even when a built-in board within a robot main body is replaced. Japanese Patent Laid-Open No. 2004-148433 (Patent Literature 2) discloses that, in order to automatically perform modifying operation of various data after a mechanism part or a mechanism unit of a robot has been replaced, when the replacement is detected, data within a robot controller are rewritten with data read from the mechanism part or the mechanism unit of the robot. The data read from the mechanism part or the mechanism unit of the robot also include data relating to an axis configuration of the robot such as arm lengths. Japanese Patent Laid-Open No. 2016-137526 (Patent Literature 3) discloses that information relating to sensors provided in a robot is read into a robot controller from a robot main body after the robot main body has been replaced. Japanese Patent Laid-Open No. 2013-56378 (Patent Literature 4) discloses that a replacing memory is used for adequately and easily transferring robot operation data from a robot controller having been used to a new robot controller.

Replacement of a robot controller connected with a robot main body of a certain model with another robot controller of the same model, or replacement of a robot main body connected with a robot controller with another robot main body of the same model is the same as changing of a combination of a robot main body with a robot controller in the same model. The techniques disclosed in Patent Literatures 1 through 4 which are capable of changing a robot main body connected with a robot controller are insufficient from a viewpoint of changing a combination of a robot main body with a robot controller in the same model. In the technique disclosed in Patent Literature 4, a parameter relating to an individual difference is required to be backed up when a robot controller is replaced and thus, its procedure is complicated. In addition, Patent Literatures 1 through 4 do not disclose a technique of changing a combination of robot main bodies of different models but whose mechanisms are the same with a robot controller.

SUMMARY

In view of the problems described above, at least an embodiment of the present invention may provide a robot system in which a robot controller and an attachment are easily replaced and connected with respect to a robot main body, and the robot system is capable of reducing data held in the robot main body and the attachment.

To solve the above-mentioned problem, at least an embodiment of the present invention may provide a robot system including a robot controller and an object robot which is an object to be controlled by the robot controller. The object robot may include a first storage part which stores a hardware identifier of the object robot, individual discrimination data which discriminate the object robot as an individual, and device specific data including an individual difference parameter which is specific to the object robot, and the same hardware identifier may be assigned to the object robot having the same mechanism as the object to be controlled by the robot controller. The robot controller may include a second storage part which stores common configuration information corresponding to the hardware identifier and the individual discrimination data and the individual difference parameter of the object robot connected with the robot controller, and a control part configured, in a case that the hardware identifier corresponding to the common configuration information stored in the second storage part and the hardware identifier assigned to the object robot are collated and matched with each other, to create hardware definition information of the object robot based on the common configuration information stored in the second storage part and the individual difference parameter read from the first storage part, and the control part may be configured to control the object robot by using the hardware definition information.

According to at least an embodiment of the present invention, the same hardware identifier may be assigned to an object robot having the same mechanism as an object to be controlled by a robot controller, and thus, the same hardware identifier may be assigned to a robot having the same mechanism even in a different model. As a result, another robot controller for the same model can be used as a robot controller to be connected with an object robot and, in addition, when a hardware identifier is the same, a robot controller for a different model can be used. Further, the hardware definition information is created by using an individual difference parameter stored in the first storage part of the object robot and thus, the robot controller is capable of performing control suitable to an actually connected object robot in consideration of the individual difference of the object robot.

The robot system in accordance with at least an embodiment of the present invention may include a template storage part which stores common configuration information of each of a plurality of the hardware identifiers and, in a case that the hardware identifier is collated and not matched, the control part reads the common configuration information corresponding to the hardware identifier assigned to the object robot from the template storage part and updates the common configuration information in the second storage part and creates the hardware definition information of the object robot by using the common configuration information after being updated. According to at least an embodiment of the present invention, common configuration information of each of a plurality of hardware identifiers has been previously prepared and, in a case that the hardware identifier is collated and not matched, the common configuration information corresponding to a hardware identifier of the robot is read to create hardware definition information and thereby, a robot which has a different mechanism is replaced within a range of ability of the robot controller and can be adequately controlled by the same robot controller. In this case, it is preferable that the template storage part is provided in an upper-level device with which the robot controller is connected. In a case that the template storage part is provided in an upper-level device, when common configuration information is prepared in the upper-level device for a robot of a new model whose mechanism is different from an existing model, a number of robot controllers connected with the upper-level device is capable of utilizing the common configuration information for the new model.

In the robot system in accordance with at least an embodiment of the present invention, the control part may collate the individual discrimination data read from the first storage part with the individual discrimination data having been already stored in the second storage part and, when a result of the collation is matched, the control part controls the object robot by the hardware definition information having been already prepared without newly creating the hardware definition information. According to this structure, when a robot is not replaced, the prior hardware definition information is used as it is and thus, duplicate preparation of hardware definition information can be prevented.

In the robot system in accordance with at least an embodiment of the present invention, it may be structured that the object robot includes a robot main body having at least a manipulator and an attachment which is separately provided from the robot main body, and different hardware identifiers are assigned to the robot main body and the attachment, and the control part collates the hardware identifier for each of the robot main body and the attachment. According to this structure, while flexibly changing a combination of a robot main body and an attachment, a robot can be controlled adequately. In this case, it may be configured that each of the robot main body and the attachment is provided with the first storage part so that the first storage part of the robot main body stores the individual discrimination data and the individual difference parameter of the robot main body, and the first storage part of the attachment stores the individual discrimination data and the individual difference parameter of the attachment. When each of a robot main body and an attachment is provided with the first storage part as described above, replacement and change can be freely performed by considering all combinations of a robot main body and an attachment.

In the robot system in accordance with at least an embodiment of the present invention, it may be configured that, in a case that a hardware identifier is separately assigned to a robot main body and an attachment, the individual discrimination data of the robot main body includes data relating to a model of the robot main body, the individual discrimination data of the attachment includes data relating to a model of the attachment, the robot controller includes a model configuration table in which allowable combinations between the model of the robot main body and the model of the attachment are described, and a warning is issued when a combination between the robot main body and the attachment which are connected with the robot controller is not described in the model configuration table. According to this structure, when unintended models are combined, the robot is prevented from being operated by a warning.

In the robot system in accordance with at least an embodiment of the present invention, it may be structured that the robot main body includes a manipulator and a hand, the manipulator and the hand are assigned with the hardware identifiers different from each other, and the control part collates the hardware identifier for each of the manipulator and the hand. According to this structure, while flexibly changing a combination of a manipulator and a hand, a robot can be controlled adequately. In this case, it may be configured that each of the manipulator and the hand is provided with the first storage part so that the first storage part of the manipulator stores the individual discrimination data and the individual difference parameter of the manipulator, and the first storage part of the hand stores the individual discrimination data and the individual difference parameter of the hand. When each of a manipulator and a hand is provided with the first storage part as described above, replacement and change can be freely performed by considering all combinations of the manipulator and the hand. In this case, when a hand is unable to provide with the first storage part, individual discrimination data and an individual difference parameter of the hand may be stored in the first storage part of a manipulator.

In the robot system in accordance with at least an embodiment of the present invention, in a case that a hardware identifier is separately assigned to a manipulator, a hand and an attachment, the individual discrimination data of the manipulator includes data relating to a model of the manipulator, the individual discrimination data of the hand includes data relating to a model of the hand, the individual discrimination data of the attachment includes data relating to a model of the attachment, the robot controller is provided with a model configuration table in which allowable combinations between the model of the manipulator, the model of the hand and the model of the attachment are described, and a warning is issued when a combination between the manipulator, the hand and the attachment which are connected with the robot controller is not described in the model configuration table. According to this structure, when unintended models are combined, the robot is prevented from being operated by a warning.

Effects of the Invention

According to the present invention, a robot system is obtained in which a robot controller and an attachment are easily replaced and connected with respect to a robot main body, and the robot system is capable of reducing data held in the robot main body and the attachment.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10 is a view showing a configuration example of a model configuration table.

DETAILED DESCRIPTION

First Embodiment

Figure 1:
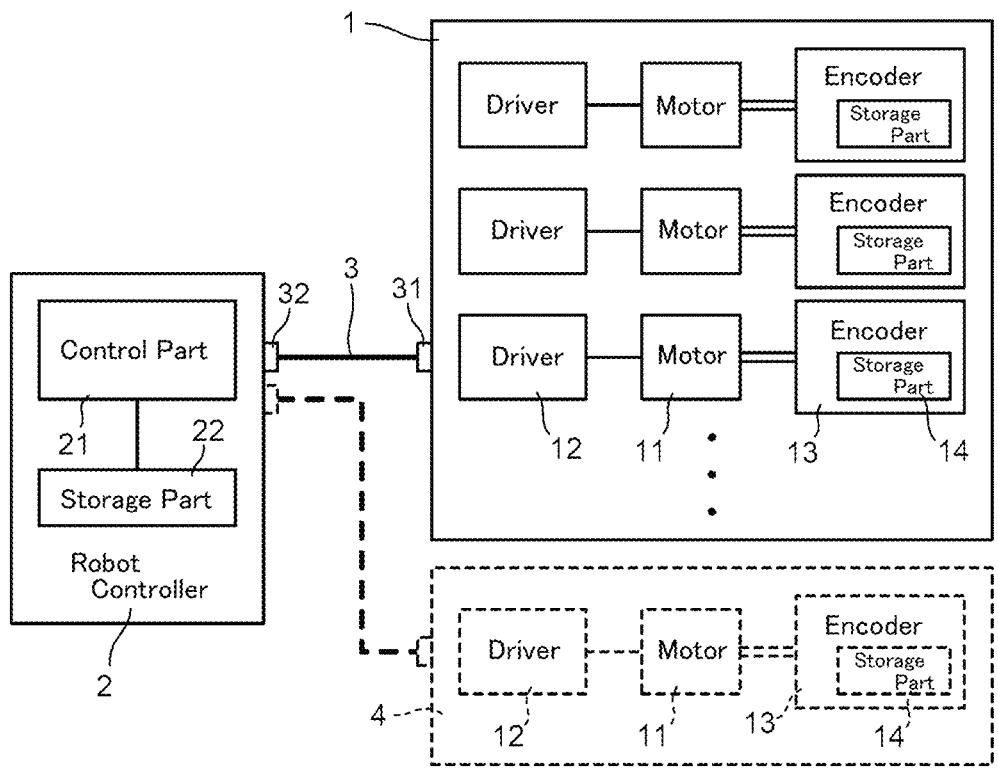
FIG. 1 is a block diagram showing a configuration of a robot system in accordance with a first embodiment of the present invention.

A preferred embodiment of the present invention will be described below with reference to the accompanying drawings. FIG. 1 shows a robot system in accordance with a first embodiment of the present invention. The robot system includes a robot main body 1 structured of a manipulator and a hand, and a robot controller 2 configured to control the robot main body 1. The robot main body 1 and the robot controller 2 are detachably connected with each other through a connection cable 3. One end of the connection cable 3 is attached with a connector 31 which is to be connected with the robot main body 1, and the other end is attached with a connector 32 which is to be connected with the robot controller 2. As shown by the broken line in FIG. 1, the robot system may be provided with an aligner 4 as an attachment which is configured to change a posture of a work and, in this case, the aligner 4 is also connected with the robot controller 2 and controlled by the robot controller 2. An attachment other than the aligner 4 may be utilized. An object to be controlled by the robot controller 2 is collectively referred to as an object robot. In this example, an object robot includes the robot main body 1 and the aligner 4.

The robot main body 1 includes a plurality of drive axes, and each of the drive axes includes a motor 11 which is a servomotor for driving the drive axis, a driver 12 configured to drive and control the motor 11 based on an instruction from the robot controller 2, and an encoder 13 which is attached to a rotation shaft of the motor 11 and is configured to detect a rotation position of the rotation shaft. Although not shown, the motor 11 is also attached with a speed reducer, pulleys and the like. The encoder 13 is provided with a nonvolatile storage part 14 in which an operation parameter of the encoder 13 is stored. The storage part 14 is typically configured of an EEPROM (electrically erasable and programmable read-only-memory). In a case that an aligner 4 is provided in a robot system, the aligner 4 is treated as a robot with one axis, in other words, a robot having one motor 11, one driver 12 and one encoder 13. An encoder 13 of the aligner is also provided with a nonvolatile storage part 14.

The robot controller 2 is provided with a control part 21, which is configured to create instructions for the motors 11 of the respective axes based on rotation positions which are read from the encoders 13 of the respective axes so that the robot main body 1 is moved on a predetermined trajectory, and a nonvolatile storage part 22 which stores parameters and the like necessary for an operation in the control part 21. The parameters stored in the storage part 22 include information indicating hardware conditions of the robot main body 1 and the aligner 4 for controlling the robot main body 1 and the aligner 4 to be connected. In the following descriptions, information indicating hardware conditions for each robot is referred to as hardware definition information "HwDef". The hardware definition information "HwDef" is configured of common configuration information and an individual difference parameter. The control part 21 controls the robot main body 1 and the aligner 4 by using the hardware definition information "HwDef". The common configuration information is information that is common and is capable of ignoring an individual difference when the robots have the same mechanism. For example, the common configuration information is one set of data which describe a configuration of a robot such as lengths of arms and a hand structuring a robot main body 1, their connecting relationships, and specifications of respective motors 11. The common configuration information is stored in the storage part 22 in advance. The individual difference parameter is a parameter which is unable to ignore an individual difference even in a case of a robot having the same mechanism and, for example, the individual difference parameter includes an offset value with respect to its home position for each encoder 13.

Even in a case that, although robots have the same mechanism, the robots are treated as different models due to, for example, difference of coating material of the exterior, these robots treated as different models can be controlled as the same model when a robot main body 1 is to be controlled by a robot controller 2. Therefore, in robots having the same mechanism, only one kind of common configuration information is stored in the storage part 22. Therefore, in this embodiment, a hardware identifier referred to as an "HW group 1D" is used for identifying whether the robot has the same mechanism or not. The "HW group 1D" and the common configuration information correspond to each other one-to-one. In a case of robots having the same mechanism, even when their models are different, the same "HW group 1D" is assigned and the same common configuration information is used as described below. On the other hand, a different "HW group 1D" is assigned to a robot which is not regarded as the same mechanism from a viewpoint of control by a robot controller. A robot main body 1 and an aligner 4 which is its attachment may be assigned with the same model name from a reason that they are sold in a combined state. However, a robot controller 2 controls them by using different parameters and thus, different "HW group IDs" are assigned. On a premise that a hand is replaced and used for a manipulator, an "HW group 1D" which is different from the manipulator may be assigned to the hand.

As described above, in a robot of the same "HW group 1D", information capable of ignoring an individual difference and regarded as common is referred to as a common configuration information. In addition, even in a robot of the same model or the same "HW group 1D", a parameter unable to ignore an individual difference, for example, an offset value of each encoder 13 to a home position is also stored in the storage part 22. A parameter corresponding to an individual difference for each robot is referred to as an individual difference parameter. When an aligner 4 is provided, an offset value of the aligner 4 is also stored in the storage part 22. When the control part 21 controls the robot main body 1 and the aligner 4, both of the common configuration information and the individual difference parameter stored in the storage part 22 are utilized.

In a robot system in this embodiment, a robot controller connected with a robot main body 1 of a certain model is capable of replacing with another robot controller for the model or a robot controller for a model of the same "HW group 1D" as the model. Alternatively, a robot main body connected with the robot controller 2 is capable of being replaced in a range of the models of the same "HW group 1D". These replacements are performed under a combination of a robot main body 1 and a robot controller 2 in a range of models of the same "HW group 1D", and these replacements are referred to as "replacement of robot controller" in the following descriptions. For example, replacement with a robot controller prepared as a spare item is also replacement of a robot controller. In this embodiment, in order to enable replacement of a robot controller, device specific data have been written in a nonvolatile storage part 14 of an encoder 13 and, when a robot system is activated, the device specific data are read into a robot controller 2 from each encoder 13. As a result of reading, when it is judged that replacement of a robot controller has been performed, the control part 21 of the robot controller 2 executes necessary processing by using the device specific data having been read from the encoder 13. In this case, when an "HW group 1D" is to be individually assigned to a hand, it is conceivable that a motor 11 is not attached to the hand and thus, the hand is provided with no encoder 13 and no storage part 14. In a case that no storage part 14 is provided in a hand, device specific information data regarding a hand may be stored in a storage part 14 of either axis of a manipulator to which the hand is attached. In the following descriptions, unless otherwise specified, an "HW group 1D" as a robot main body 1 is collectively assigned to a manipulator and a hand.

Figure 2:
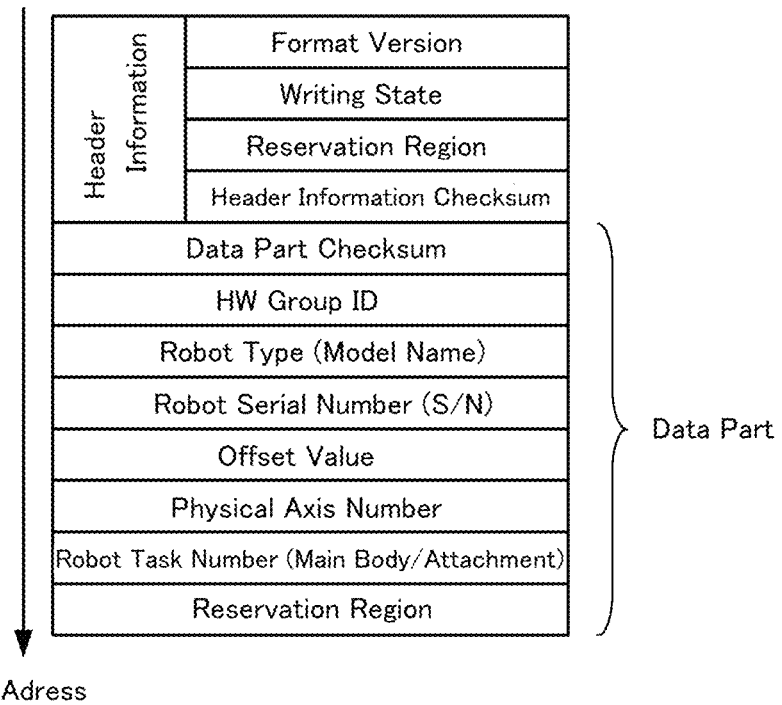
FIG. 2 is a view showing a format of device specific data stored in each encoder.

FIG. 2 shows an example of a format of device specific data stored in the storage part 14 for each encoder 13. The device specific data are fixed length data including an "HW group 1D" which is a hardware identifier, data indicating a type (model) of a robot, data for discriminating a robot main body 1 and an aligner 4 as an individual, and a parameter which is variable as an individual difference parameter in the robot main body 1 and the aligner 4 having the same structure (for example, an offset value to a home position). Data for discriminating a robot main body 1 and an aligner 4 as an individual are referred to as individual discrimination data. In this embodiment, a serial number is an individual discrimination data, but other data may be used as an individual discrimination data. As shown in FIG. 2, the device specific data are configured of header information and a data part in an address order. Similar device specific data are also stored in a storage part 14 of an aligner 4. The header information includes a field of a format version identifying a format of device specific data, a field of a writing state, a reservation region, and a field of a checksum in the header part. In a field of a writing state, data are written which indicate whether the device specific data are in an initial state, whether writing has been completed, or whether writing has not been completed in the middle of the writing. A field of a checksum of the header part is a field storing a checksum for the field of the format version, the field of the writing state and the reservation region of the header part.

The data part is configured of a region of a checksum of the data part where a checksum for the entire data part is stored, a field where an "HW group 1D" is stored, a field of a robot type which is data indicating a model of the robot, a field of a serial number, a field of an offset value to a home position, a field of a physical axis number, a field of a robot task number, and a reservation region. In this embodiment, an individual difference parameter which is stored as device specific data for each encoder 13 is not data relating to the entire robot main body 1 but is limited to data relating to the encoder 13. Therefore, an offset value of a rotation position of the encoder 13 which stores its device specific data is stored as an offset value relating to a home position when the robot main body 1 is located at the home position. An individual difference parameter stored in the storage part 14 of an aligner 4 is limited to data relating to an encoder 13 of the aligner 4. The field of a physical axis number indicates that, in a case that the robot main body 1 includes a plurality of drive axes and physical axis numbers are uniquely assigned to these drive axes, an encoder 13 storing the device specific data belongs to which drive axis. The robot task number is a number which indicates whether an encoder 13 storing the device specific data belongs to a robot main body 1 or an attachment such as an aligner 4. When a plurality of attachments is used, different robot task numbers are assigned. Normally, a robot task number "1" indicates a robot main body 1 and, as a robot task number increases "2", "3", . . . , the robot task numbers indicate a first attachment, a second attachment, and so on. The serial number configures individual discrimination data, and each of a physical axis number and a robot task number is one of information regarding a configuration of an object robot.

Commonly, an encoder 13 is not detached from a motor 11 and thus, in a robot main body 1 and an aligner 4, a motor 11 is replaced together with an encoder 13. Therefore, device specific data which are stored in the storage part 14 of an encoder 13 are associated with the motor 11. When a motor 11 is replaced, an offset value to a home position also varies due to variation of assembling or the like of the motor 11 and thus, an adjustment operation is required to perform again for determining an offset value. Therefore, in this embodiment, although replacement of a controller is allowed, replacement of a motor 11 itself in a robot main body 1 and an aligner 4 is not allowed and is defined as an error. By similar reason, a physical axis number stored in an encoder 13 must be matched with a physical axis number of a drive shaft actually related to the encoder 13. Further, in encoders 13 included in the same robot main body 1, all the serial numbers of the device specific data are set to be the same. On the other hand, the serial number of the device specific data is set to be different from that in an encoder 13 which is included in another robot main body 1. In an aligner 4 which is simultaneously used with a robot main body 1, a serial number in device specific data of the robot main body 1 and a serial number in device specific data of the aligner 4 may be set the same, or may be different from each other.

The data configuration of the device specific data has been described above with reference to FIG. 2. However, as an individual difference parameter stored in the device specific data, a parameter other than an offset value to a home position may be used, and plural kinds of parameters may be used. In addition, in order to detect inappropriate replacement, information other than the serial number may be used as information for discriminating a robot as an individual, or another information may be used in addition to the serial number.

Next, processing in a robot system when a robot controller 2 is replaced will be described below. In this embodiment, it is sufficient that a robot controller 2 is prepared, instead of preparing for each model, for each hardware identifier of a robot to be controlled, in other words, for each "HW group 1D". Therefore, a storage part 22 of a robot controller 2 is stored with data indicating an "HW group 1D", common configuration information indicating dimensions and specifications common to robots of models of the "HW group 1D", and individual discrimination data and an individual difference parameter of the robot main body 1 (and aligner 4) which is connected currently or has been connected until now. An initial value may be stored instead of individual discrimination data and an individual difference parameter of a robot main body 1 (and aligner 4) connected currently or has been connected until now and, in addition, portions of individual discrimination data and an individual difference parameter may be cleared to initial values by a command operation in the robot controller 2.

Figure 3:
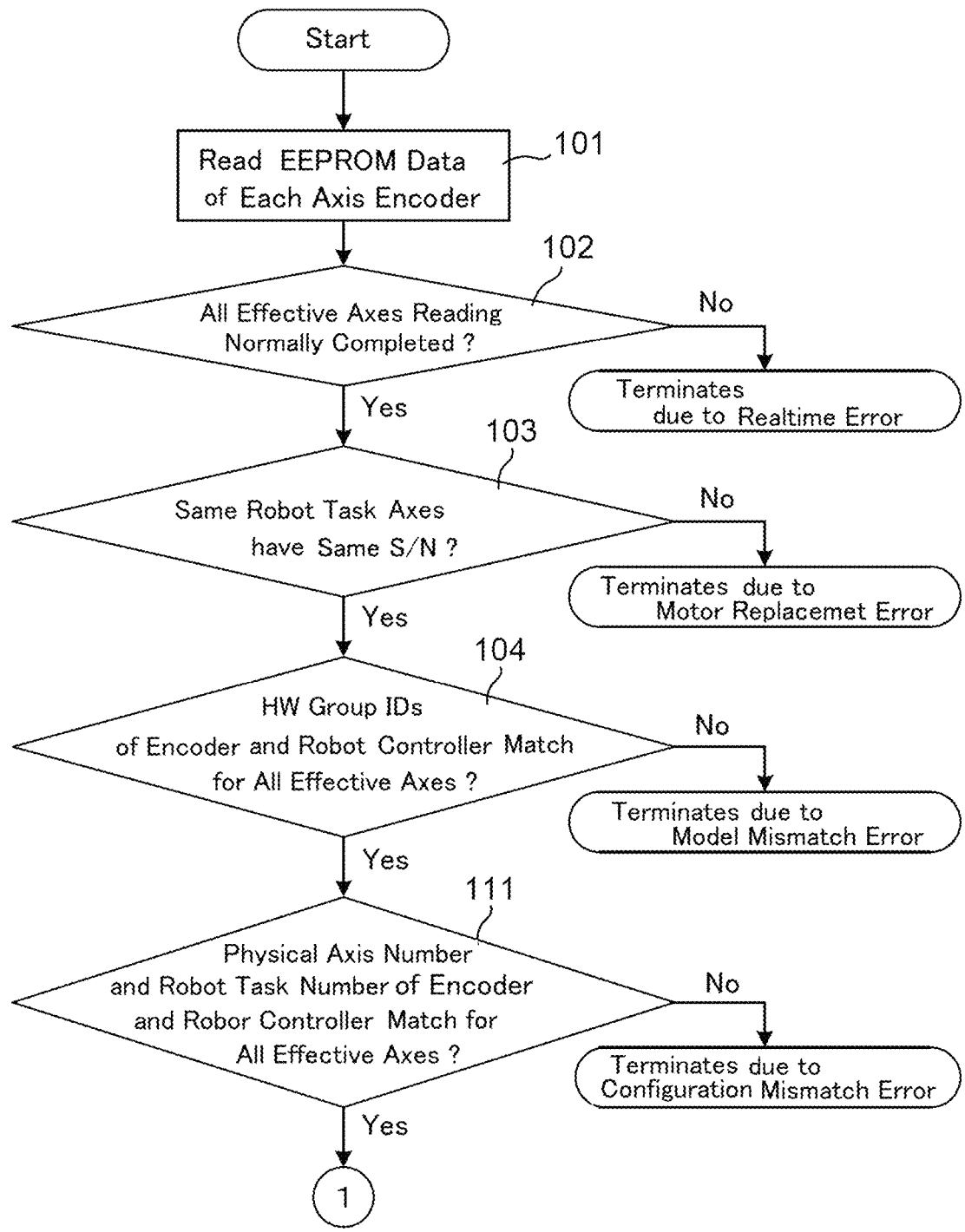
FIG. 3 is a flow chart showing an operation of the robot system shown in FIG. 1.
Figure 4:
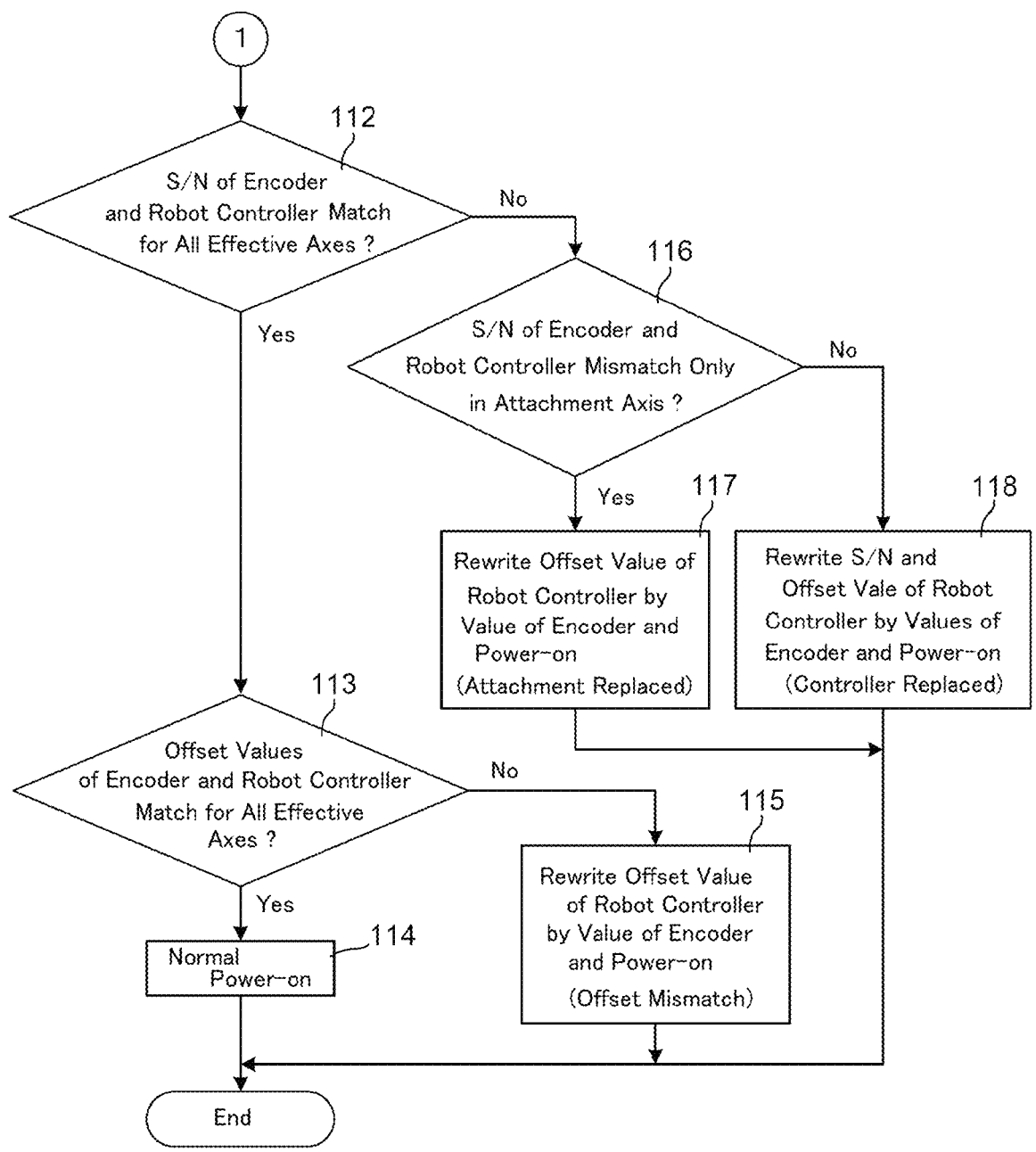
FIG. 4 is a flow chart showing an operation of the robot system shown in FIG. 1.

FIGS. 3 and 4 are flow charts showing processing executed in the robot system. Processing shown in this embodiment is that for activating a robot system by a robot controller 2 at a time of power-on or the like. In the following descriptions, when only a robot main body 1 is connected with a robot controller 2, each drive axis of the robot main body 1 is referred to as an effective axis and, when both of a robot main body 1 and an aligner 4 are connected with a robot controller 2, each of drive axes of the robot main body 1 and the aligner 4 is referred to as an effective axis. When power is supplied to the robot system in a state that a robot main body 1 is connected and, if necessary, an aligner 4 is connected, in step 101, a control part 21 of a robot controller 2 reads device specific data from an encoder 13 of each of effective axes, which are stored in a storage part (EEPROM) 14 of the encoder 13 and then, in step 102, the control part 21 determines whether reading of data of all the effective axes has been normally completed or not. When the reading is not completed normally, the control part 21 determines that a realtime error has occurred and terminates the operation of the robot system. In a case that the reading of data of all the effective axes has been normally completed, in step 103, the control part 21 determines whether serial numbers are the same as each other or not in device specific data of the axes whose robot task numbers in data read from the encoders 13 are the same as each other. A state that the device specific data whose serial numbers are not the same are existed means that a motor 11 has been replaced and thus, the control part 21 determines that a motor replacement error has occurred and terminates the operation of the robot system.

In a case that the motor replacement error has not occurred in the step 103, the control part 21 determines in step 104 for all the effective axes whether an "HW group 1D" read from an encoder 13 matches an "HW group 1D" previously stored in the storage part 22 or not for each effective axis. When they do not match, it is judged that a robot main body 1 or an aligner 4 other than a model of an "HW group 1D" to be controlled by the robot controller 2 is connected with the robot controller 2 and thus, the control part 21 determines that a model mismatch error has occurred and the control part 21 terminates the operation of the robot system. In the step 104, when the "HW group IDs" match, the control part 21 determines in step 111 for all the effective axes whether a physical axis number and a robot task number read from the encoder 13 match a physical axis number and a robot task number previously stored in the storage part 22 or not. When the robot controller 2 reads device specific data from a plurality of encoders 13, data are read from the encoders 13 one by one in a predetermined order. However, data may be read in an order different from a normal order due to erroneous connection of motor wiring or the like and, in this case, a physical axis number or a robot task number is mismatched. Even when data are read in parallel from a plurality of the encoders 13, if an erroneous connection of wiring has occurred, the physical axis number or the robot task number is mismatched. Therefore, when a physical axis number or a robot task number is mismatched, the control part 21 determines that a configuration mismatch error has occurred and terminates the operation of the robot system.

In the step 111, when the physical axis number and the robot task number are matched for all the effective axes, the control part 21 determines in step 112 for all the effective axes whether a serial number read from the encoder 13 matches a serial number stored in the storage part 22 or not. When they match, this is a case that neither robot controller 2 nor aligner 4 is replaced and, next, the control part 21 determines in step 113 for all the effective axes whether an offset value stored in the storage part 22 matches an offset value read from the encoder 13 or not. In a case that the offset values match for all the effective axes, it is determined that the offset values stored in the storage part 22 of the robot controller 2, in other words, the individual difference parameters are appropriate. Therefore, the control part 21 normally starts the robot system in step 114 and terminates system start-up processing. When the system start-up processing is terminated, the robot controller 2 executes control of the robot main body 1 and the aligner 4 by using the hardware definition information "HwDef" prepared previously and stored in the storage part 22.

In the step 113, a case that an offset value previously stored in the storage part 22 of the robot controller 2 does not match an offset value read from the encoder 13 is a case that, although readjustment or the like of a motor 11 is performed, the result is not reflected in the robot controller 2. Therefore, the control part 21 rewrites the offset value stored in the storage part 22 by the offset value read from the encoder 13 in step 115, and the control part 21 creates hardware definition information "HwDef" based on the offset value rewritten, stores in the storage part 22 and terminates the processing. After that, when power activation is performed again, the processing from the step 101 to the step 112 is executed and then, processing of the step 113 and the step 114 is successively executed and thus, the robot system starts normally based on the offset value having been rewritten and the robot is controlled based on the hardware definition information "HwDef" stored in the storage part 22.

In the step 112, when the serial numbers do not match, either case is occurred that the robot controller 2 has been replaced or the aligner 4 has been replaced. Therefore, when a mismatch of the serial numbers has occurred in the step 112, the control part 21 determines in step 116 whether the mismatch of the serial numbers has occurred only in an axis of the aligner 4 distinguished from the robot task number or not. In a case that the mismatch of the serial numbers has occurred only in the axis of the aligner 4, the control part 21 determines that the aligner 4 is replaced and thus, the control part 21 rewrites in step 117 an offset value stored in the storage part 22 by an offset value read from the encoder 13 of the axis of the aligner 4, creates hardware definition information "HwDef" by using common configuration information and the offset value having been rewritten to store in the storage part 22, and terminates the processing. After that, when power-on is performed again, the robot system starts normally based on the offset value having been rewritten and the aligner 4 is controlled based on the hardware definition information "HwDef" stored in the storage part 22.

In a case that a mismatch of the serial numbers has also occurred other than an axis of the aligner 4 in the step 116, it is determined that a robot controller 2 is replaced. Therefore, in step 118, the control part 21 rewrites a serial number and an offset value stored in the storage part 22 with a serial number and an offset value read from the encoder 13 for all the effective axes, and the control part 21 creates hardware definition information "HwDef" by using common configuration information and the offset value having been rewritten to store in the storage part 22 and terminates the processing. When power activation is performed again, the robot system starts normally based on the serial number and the offset value which have been rewritten and the robot main body 1 is controlled based on the hardware definition information "HwDef" stored in the storage part 22. In this embodiment, a serial number and an offset value stored in the storage part 22 of the robot controller 2 are rewritten by the serial number (in other words, individual discrimination data) and the offset value (in other words, individual difference parameter) read from the encoder 13 of the robot main body 1 (and the aligner 4). Therefore, the robot controller 2 creates and stores hardware definition information "HwDef" based on the offset value having been rewritten and thus, in a case that the robot main body 1 and the aligner 4 to be connected are replaced, the robot controller 2 is capable of being matched with the robot main body 1 and the aligner 4 having been replaced. Further, also in a robot controller 2 which is a spare item whose storage part 22 is stored with initial values in individual discrimination data (serial number) and an individual difference parameter (offset value), when the processing in this embodiment is executed, the robot controller 2 is adaptable to control of the robot main body 1 and the aligner 4 which are connected with the robot controller 2.

Figure 5:
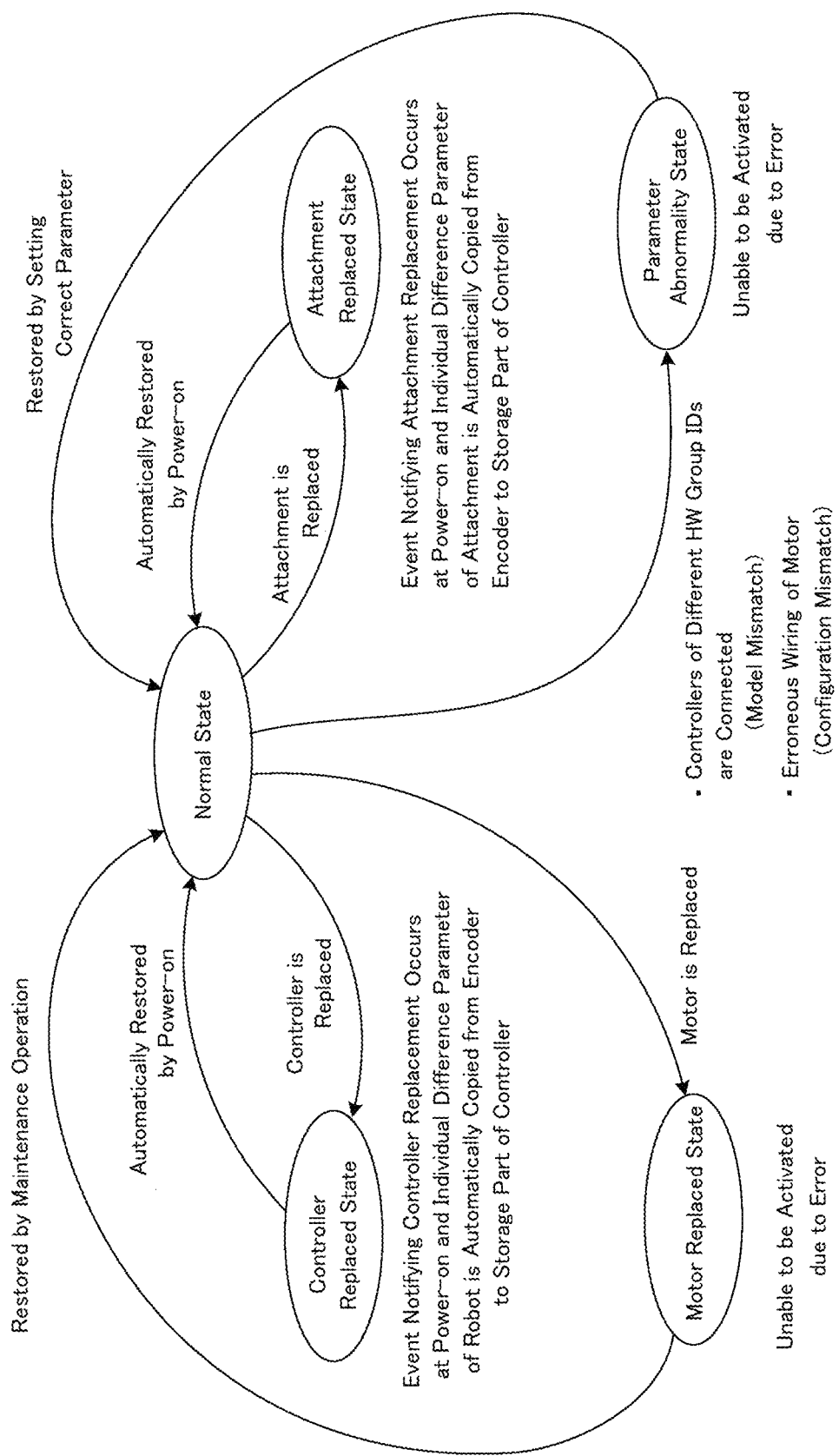
FIG. 5 is a state transition diagram showing an operation of the robot system shown in FIG. 1.

FIG. 5 is a state transition diagram for explaining the processing described above. When the robot controller 2 is in a state adaptable to control of a robot main body 1 and an attachment such as an aligner 4 which are connected with the robot controller 2, the state is referred to as a normal state. In the normal state, when replacement of a robot controller 2 is performed, an event showing that the replacement of the robot controller 2 has been performed has occurred at the time of power-on as shown in the step 118, and an individual difference parameter is automatically copied from the encoder 13 to the storage part 22 of the robot controller 2 and the state is returned to the normal state. After that, when an operation of power-on is performed, the state is automatically restored to the normal state. Similarly, when an attachment such as an aligner 4 is replaced, an event showing that the replacement of the attachment has been performed has occurred at the time of power-on as shown in the step 117, and an individual difference parameter is automatically copied from the encoder 13 to the storage part 22 of the robot controller 2 and the state is returned to the normal state. On the other hand, when replacement of a motor has been performed, a motor replacement error occurs as shown in the step 103, and power-on processing of the robot system is abnormally terminated and the robot system is unable to be activated. In order to restore the normal state from the motor replacement error, a maintenance operation such as a readjustment operation for the axis corresponding to the replaced motor is required. Both of a model mismatch error determined in the step 104 and a configuration mismatch error determined in the step 105 are classified into a parameter abnormality in device specific data stored in the robot main body 1, the aligner 4 and the robot controller 2. When determined as a parameter abnormality, the power-on processing of the robot system is abnormally terminated and the robot system is unable to be activated. In order to restore the normal state from the parameter abnormality, it is required to set a correct parameter by performing that, for example, a robot controller 2 of a correct model is used and erroneous wiring is corrected.

Effects in First Embodiment

According to the first embodiment, when power is supplied or the like, device specific data stored in the encoder 13 of an object robot (robot main body 1 and aligner 4) are read out and collated with device specific data which are stored in the robot controller 2 and, when replacement of the robot controller 2 is detected, the latest individual difference parameter is read into the robot controller 2 from the object robot. Therefore, a robot controller 2 for the same model and, in addition, a robot controller for a different model in a range that a hardware identifier, i.e., an "HW group 1D" is the same can be replaced and used and thus, control suitable to the object robot connected with the robot controller 2 can be executed by using the robot controller 2 having been replaced. Further, when a mismatch of a model and a mismatch of configuration have occurred and, when replacement of a motor has been detected, activation is unable to be performed and thereby, a robot main body and an aligner can be prevented from being operated in an inappropriate state.

Second Embodiment

Figure 6:
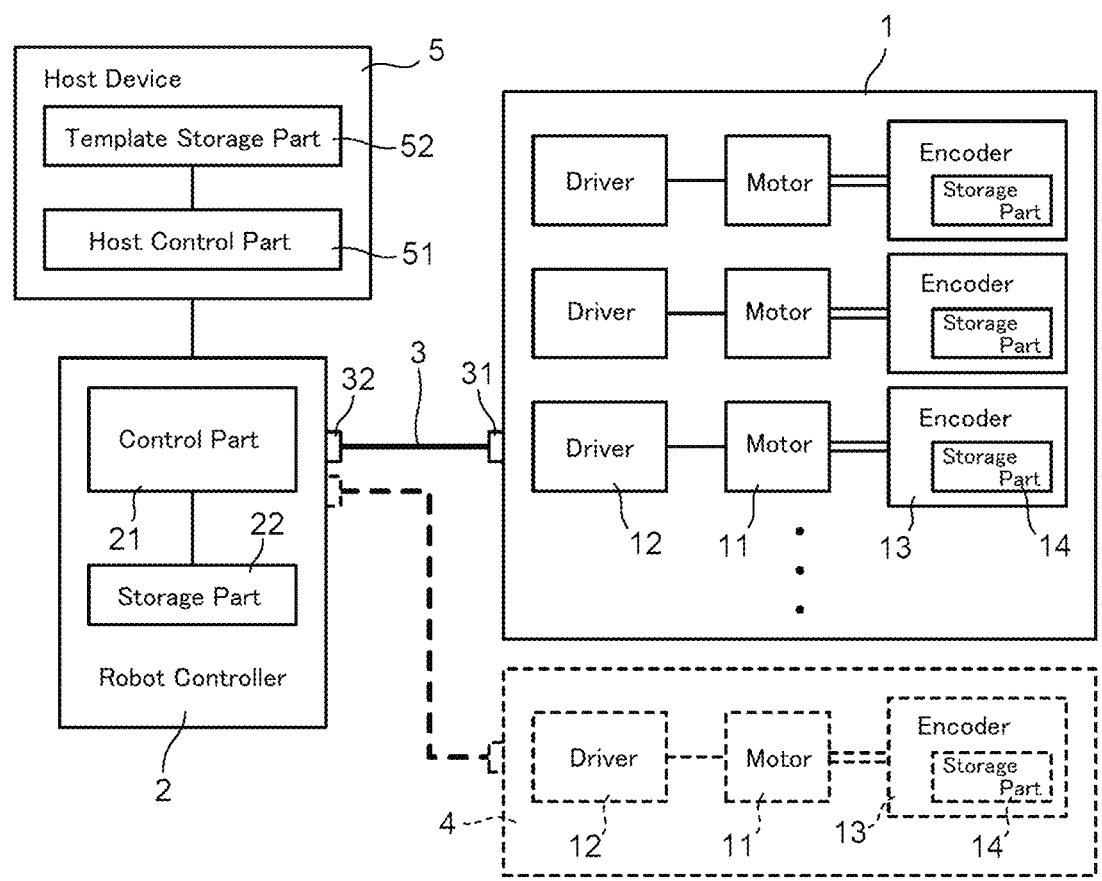
FIG. 6 is a block diagram showing a configuration of a robot system in accordance with a second embodiment of the present invention.

In the first embodiment described above, the robot controller 2 is stored with common configuration information relating to a single specific "HW group 1D" and thus, a robot controller 2 is required to prepare for each "HW group 1D". Otherwise, in the step 104 of the flow chart shown in FIG. 3, a model mismatch error occurs. However, when there is no large difference in the number of axes of a robot and in a rated value of a motor to be used, there is possibility that the same robot controller 2 is capable of controlling robots of models whose "HW group IDs" are different. Therefore, in a robot system in accordance with a second embodiment of the present invention, within a range of physical restrictions in the robot controller 2, for example, within a range of the maximum number of axes for which the robot controller 2 is capable of controlling and within a range of the maximum rating of a motor capable of being controlled, the robot controller 2 is configured to be capable of controlling robots of various models of two or more kinds of "HW group IDs". FIG. 6 is a block diagram showing a configuration of a robot system in accordance with the second embodiment of the present invention.

A robot system in the second embodiment shown in FIG. 6 includes a host device 5 with which the robot controller 2 is connected in the robot system shown in FIG. 1 so that a robot main body 1 of a model of a different "HW group 1D" can be controlled by the same robot controller 2. The host device 5 is an upper-level device to the robot controller 2. In this embodiment, one robot controller 2 is connected with the host device 5, but a plurality of robot controllers 2 may be connected with the host device 5. Especially, when it is structured that a plurality of robot controllers 2 is connected with the host device 5 through a network, for example, a model of a robot connected with the robot controller 2 can be arbitrarily changed for all the robot controllers 2 in a factory. The same robot main body 1 and the same aligner 4 as described in the first embodiment are used and, especially, device specific data stored in the storage part 14 are the same as those in the first embodiment.

The host device 5 is a device which collectively manages programs and the like used in the robot controller 2 and is commonly configured as a server device, and the host device 5 includes a host control part 51 and a template storage part 52. The host control part 51 controls the entire host device 5 and is, for example, realized by an operating system or the like. The template storage part 52 stores programs and data which are transmitted to the robot controller 2 depending on a request from the robot controller 2. Especially, in this embodiment, the template storage part 52 stores general-purpose hardware definition information "GHwDef" for each of a plurality of "HW group IDs". In order that robot controllers 2 which may be connected with the host device 5 are capable of supporting robots of a lot of models, the host device 5 is prepared with general-purpose hardware definition information "GHwDef" for each of a number of "HW group IDs". The general-purpose hardware definition information "GHwDef" configures a template used when the robot controller 2 creates hardware definition information "HwDef" and includes common configuration information and an individual difference parameter corresponding to the "HW group 1D". However, in the hardware definition information "HwDef" stored in the template storage part 52, common configuration information and an individual difference parameter are individually managed for each "HW group 1D", and the information memorized as an individual difference parameter may be an initial value of an individual difference parameter or may be an individual difference parameter transmitted from a specific robot controller 2 for backup.

Figure 7A:
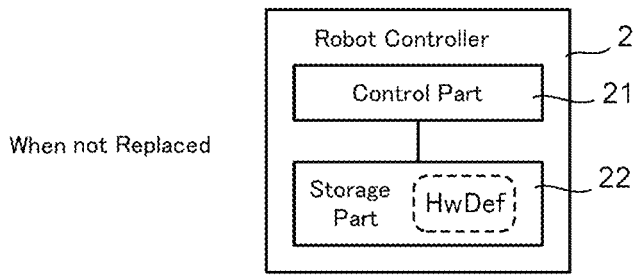
FIG. 7A, FIG. 7B and FIG. 7C are explanatory views showing reading of hardware definition information "HwDef" into a robot controller.
Figure 7B:
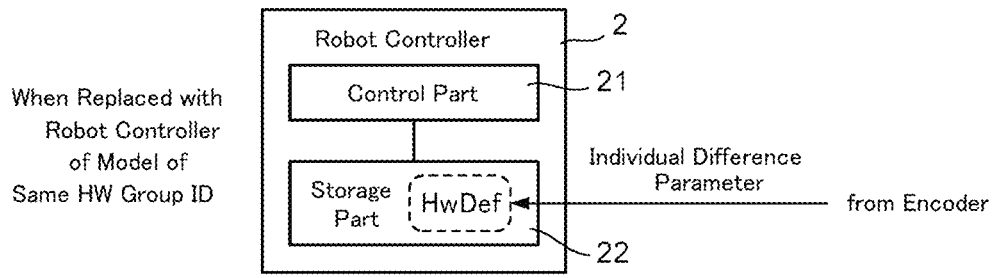
Figure 7C:
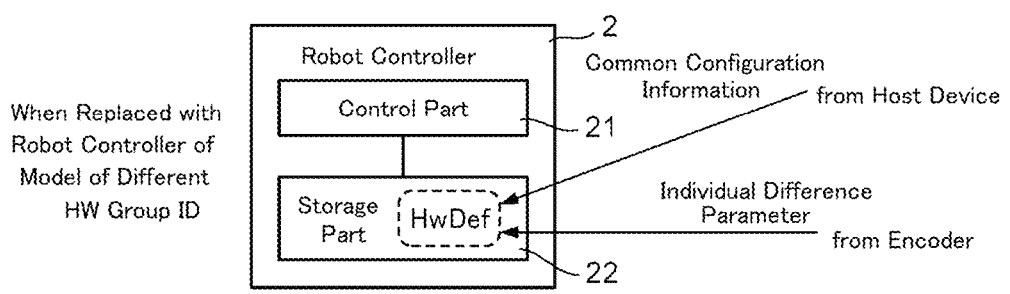

FIGS. 7A, 7B and 7C show cases from where common configuration information and an individual difference parameter are read into the robot controller 2. FIG. 7A shows a case that a robot main body 1 and an aligner 4 connected with the robot controller 2 are not replaced. In this case, the robot controller 2 is operated by the hardware definition information "HwDef" having been read into the storage part 22 of the robot controller 2. FIG. 7B shows a case that a robot controller connected with the robot main body 1 is replaced with a robot controller of the same "HW group 1D". In this case, the robot controller 2 reads only an individual difference parameter from the robot main body 1 and the aligner 4 which are newly connected and updates an individual difference parameter of the hardware definition information "HwDef" stored in the storage part 22. FIG. 7C shows a case that a robot controller 2 connected with a robot main body 1 is replaced with a robot controller 2 of another "HW group 1D". This is equivalent to a case that a robot main body 1 of a different "HW group 1D" is connected with the robot controller 2. In this case, the robot controller 2 reads common configuration information of a robot main body 1 and an aligner 4 which are newly connected from the host device, and the robot controller 2 reads individual difference parameters from encoders 13 of the robot main body 1 and the aligner 4. As a result, in the robot controller 2, the hardware definition information "HwDef" in the storage part 22, in other words, common configuration information and an individual difference parameter are updated by the device configuration information and the individual difference parameter having been read.

Next, processing in the robot system when a robot controller 2 is replaced will be described below. A storage part 22 of a robot controller 2 is stored with hardware definition information "HwDef", and the hardware definition information "HwDef" is created by the robot controller 2 based on currently corresponding to the "HW group 1D" relating to the robot main body 1 currently connected or having been connected until now. In addition, the storage part 22 of the robot controller 2 is also stored with individual discrimination data for indicating which robot the hardware definition information "HwDef" having been stored corresponds to. The storage part 22 may be stored with initial values instead of individual discrimination data and an individual difference parameter of a robot main body 1 (and aligner 4) currently connected or having been connected until now. In addition, individual discrimination data and an individual difference parameter may be cleared to initial values by a command operation in the robot controller 2. As an initial value, an individual difference parameter included in general-purpose hardware definition information "GHwDef" of the host device 5 may be used based on an "HW group 1D" of a robot main body 1 or an aligner 4 connected.

Figure 8:
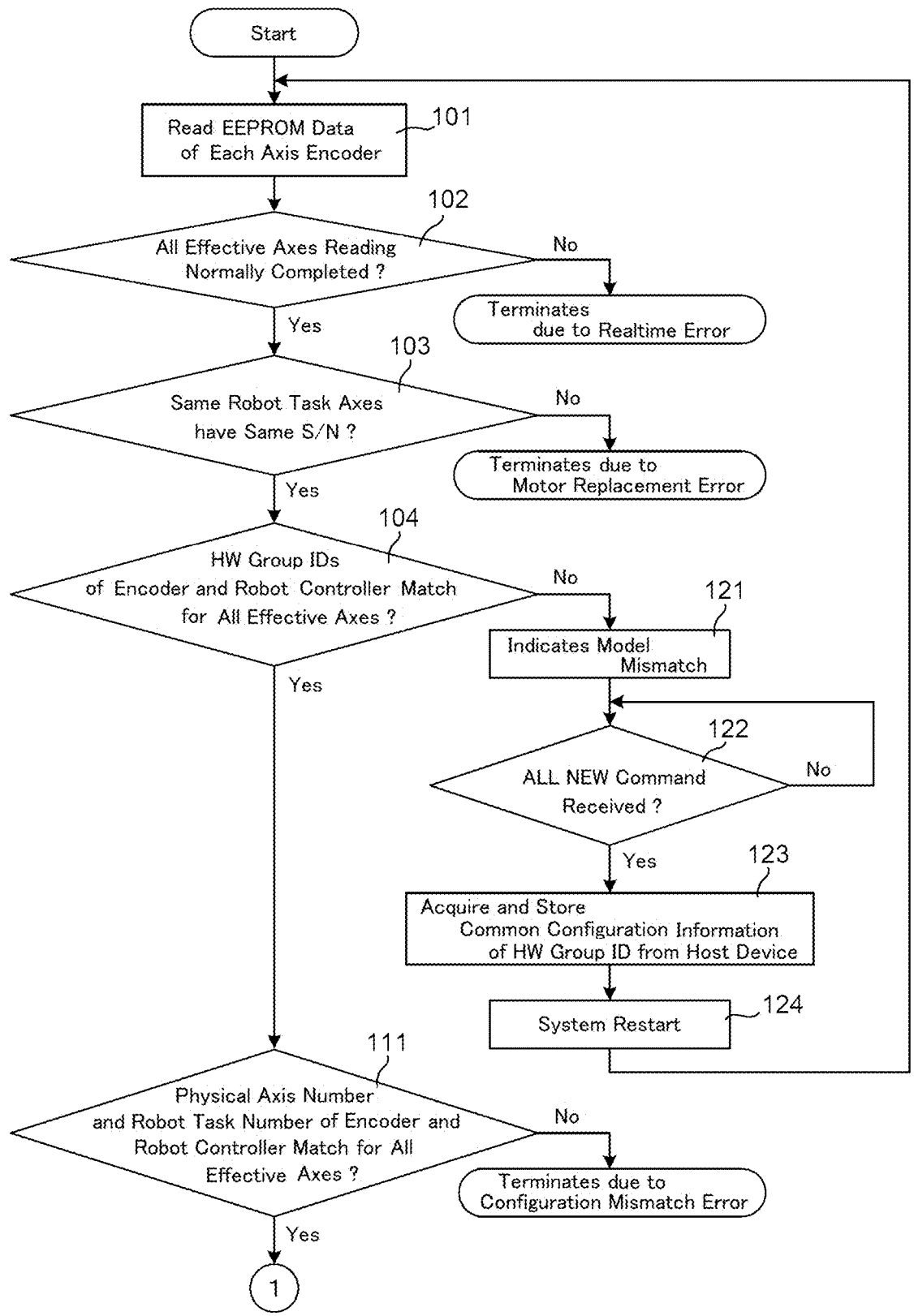
FIG. 8 is a flow chart showing an operation of the robot system shown in FIG. 6.

FIG. 8 is a flow chart showing processing of a robot controller 2 which activates the robot system at a time of power-on or the like, and the processing is executed in a robot system in the second embodiment of the present invention. Processing of steps 101 through 103, and step 111 in FIG. 8 is the same as the processing of the steps 101 through 103 and the step 111 in FIG. 3 and thus their descriptions are omitted. Further, in the step 111, in a case that a configuration mismatch error does not occur, the processing from the step 112 in FIG. 4 is executed. Processing succeeding to the step 112 is also the same as the case of the first embodiment and thus, their descriptions are omitted.

In a case that a motor replacement error does not occur in the step 103, the control part 21 determines in the step 104 whether an "HW group 1D" read from the encoder 13 for each effective axis matches an "HW group 1D" previously stored in the storage part 22 or not for all the effective axes. When matches, the step 111 is performed similarly to the case of the first embodiment. A state that the "HW group 1D" does not match is a model mismatch error in the first embodiment but, in the second embodiment, the robot controller 2 indicates a state of a model mismatch to an operator in step 121 and waits an input of an ALL NEW command from the operator in step 122. When an ALL NEW command is inputted, in step 123, the control part 21 downloads, based on an "HW group 1D" acquired from the encoder 13, general-purpose hardware definition information "GHwDef" corresponding to the "HW group 1D", especially, common configuration information included in the general-purpose hardware definition information "GHwDef" from the host device 5 and stores into the storage part 22 and, in step 124, the robot system is restarted. Alternatively, the control part 21 may automatically execute an ALL NEW command without waiting for an operator to input it and, after that, the control part 21 may automatically restart the robot system.

When an ALL NEW command is executed and the system is restarted, the robot controller 2 functions as a robot controller which is matched with a model of the "HW group 1D" acquired from the encoder 13. After that, the control part 21 of the robot controller 2 executes processing from the step 101 again. When the processing from the step 101 is executed again, in the step 104, the "HW group IDs" of the encoder 13 and the robot controller 2 should match and thus, processing of the step 111 is executed successively and processing is executed which is the same as a case that the robot controller 2 for the same "HW group 1D" is replaced. In this manner, in this embodiment, the robot main body 1 can be connected with the robot controller 2 of a different "HW group 1D", and the robot controller 2 can be replaced without being limited by an "HW group 1D". In other words, within a range of physical restriction of the robot controller 2 and, as long as a general-purpose hardware definition information "GHwDef" is prepared in the host device 5, a robot main body 1 and an aligner 4 of a different "HW group 1D" can be connected with the robot controller 2, and the robot main body 1 and the aligner 4 can be controlled.

Figure 9:
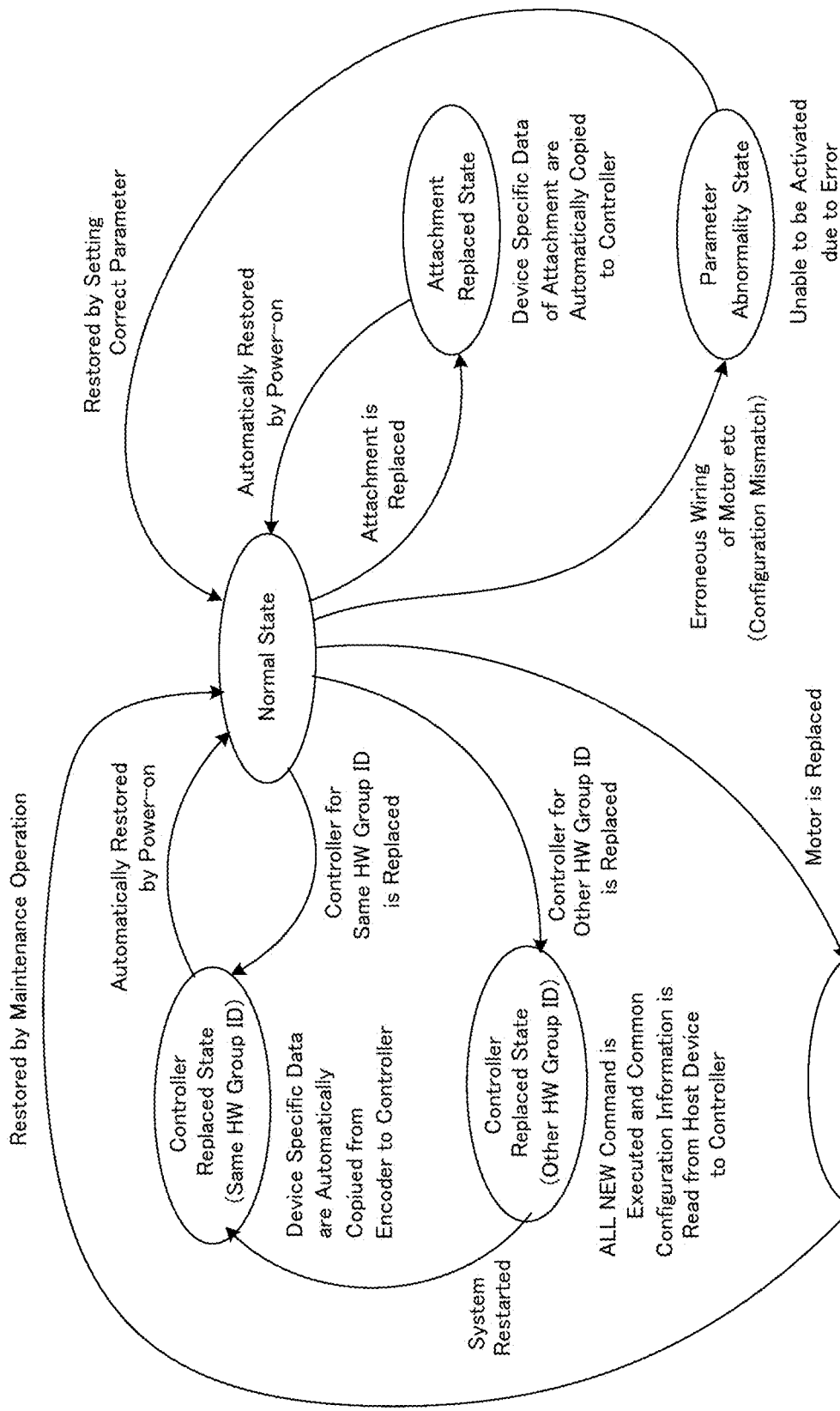
FIG. 9 is a state transition diagram showing an operation of the robot system shown in FIG. 6.

FIG. 9 is a state transition diagram for explaining the processing described above in the second embodiment. When the robot controller 2 is in a state adaptable to control of a robot main body 1 and an attachment such as an aligner 4 which are connected with the robot controller 2, the state is referred to as a normal state. In the normal state, when replacement of a robot controller 2 of the same "HW group 1D" is performed, an event showing that replacement of the robot controller 2 has been performed occurs at the time of power-on as shown in the step 118, and device specific data including an individual difference parameter are automatically copied from the encoder 13 to the storage part 22 of the robot controller 2 and hardware definition information "HwDef" is updated by the individual difference parameter. After that, when an operation of power-on is performed, the state is automatically returned to the normal state. In the normal state, when replacement of a robot controller 2 of a different "HW group 1D" is performed, an event showing the replacement occurs at the time of power-on as shown in the step 104, and an ALL NEW command is inputted and common configuration information of the corresponding "HW group 1D" is read into the storage part 22 of the robot controller 2. After that, when the system is restarted, the state is transferred to a state that a robot controller of the same model is replaced and, similarly to the above case, device specific data are automatically copied to the storage part 22 of the robot controller 2 and the normal state is restored.

In a case that an attachment such as an aligner 4 is replaced, an event showing that an attachment has been replaced occurs at the time of power-on as shown in the step 117, an individual difference parameter is automatically copied from the encoder 13 to the storage part 22 of the robot controller 2 to return to the normal state. On the other hand, when replacement of a motor has been performed, a motor replacement error occurs as shown in the step 103, and power-on processing of the robot system is abnormally terminated and the robot system is unable to be activated. In order to restore the normal state from the motor replacement error, a maintenance operation such as a readjustment operation for the axis corresponding to the replaced motor is required. A configuration mismatch error determined in the step 105 is classified into a parameter abnormality in device specific data stored in the robot main body 1, the aligner 4 and the robot controller 2. When determined as a parameter abnormality, the power-on processing of the robot system is abnormally terminated and the robot system is unable to be activated. In order to restore the normal state from the parameter abnormality, it is required to set a correct parameter by performing that, for example, erroneous wiring is corrected.

In the second embodiment described above, when a model does not match in the step 104, the robot controller 2 reads common configuration information or general-purpose hardware definition information "GHwDef" of the corresponding "HW group 1D" from the host device 5 having the template storage part 52. However, it may be configured that a template storage part is provided in a robot controller 2, and common configuration information and general-purpose hardware definition information "GHwDef" corresponding to each of a plurality of "HW group IDs" are previously stored in the template storage part and, when a model mismatch occurs, common configuration information or general-purpose hardware definition information "GHwDef" is read from the template storage part in the robot controller 2. In this case, in order to apply a robot controller 2 to a robot of a new model whose structure is different from an existing robot and to which a new "HW group 1D" is assigned, it is preferable that a host device 5 is provided and common configuration information or general-purpose hardware definition information "GHwDef" is downloaded from the host device 5 to the robot controller 2.

In the second embodiment, an "HW group 1D" is independently assigned to each of a robot main body 1 and an attachment such as an aligner 4. The number of possible combinations of a robot main body 1 and an attachment (for example, aligner 4) may become enormous according to the number of "HW group IDs". Further, an "HW group 1D" can be separately assigned to a manipulator and a hand instead of assigning an "HW group 1D" to a robot main body 1 but, in this case, the number of the combinations is further increased. In such combinations, a combination which is unfavorable or is not assumed may be existed. For example, a combination of a robot main body 1 for use in a clean room and an aligner 4 for a heavy object under an adverse environment which is provided with no mechanism for preventing dust and oil mist generation is normally unthinkable. In other words, in combinations between robot main bodies 1 of plural models having the same mechanism and aligners 4 of plural models having the same mechanism, unfavorable combinations of the models may be existed. In addition, an unfavorable combination may be existed in combinations between "HW group IDs" of robot main bodies 1 and "HW group IDs" of aligners 4. For example, there is a case that an aligner 4 of a certain specific "HW group 1D" is unable to be used due to a reach range of a hand of a robot main body 1. Therefore, in this embodiment, a model configuration table in which combinations of allowable models and allowable "HW group IDs" are described is stored in the storage part 22 of the robot controller 2 and, in a case that there is no combination in the model configuration table, a warning is issued from the robot controller 2 so that the robot system is unable to be operated in the combination.

FIG. 10 shows an example of a configuration of the model configuration table. As described above, a task number of a robot main body 1 is "1", a task number of an aligner 4 which is an attachment is "2", and an "HW group 1D" is assigned for each task. In this model configuration table, entries whose task number is "3" or more are also provided in consideration of additional attachments. In this example, regarding a robot main body 1, a manipulator and a hand are managed with the same "HW group 1D", but a robot type (model) is determined separately for a manipulator and a hand. Robot types on the most left column are robot types assigned at shipment and are described for convenience. Robot types at shipment are not stored in a storage part 14 in a robot main body 1 and in an aligner 4 and thus, they are not used to determine whether a combination is permitted or not by using the model configuration table. In other words, in the model configuration table shown in FIG. 10, when there are descriptions in each row in the portion surrounded by the thick line, a combination of a robot main body 1 including a combination of a manipulator and a hand and an aligner 4 can be determined as a preferred combination. As described above, when a combination is managed in a model unit by using the model configuration table, a robot main body 1 and an aligner 4 can be prevented from being used in an unfavorable combination.

Effects of Second Embodiment

According to this embodiment, in addition to the effects of the first embodiment, when replacement of a robot controller of a different "HW group 1D" is detected, the robot controller 2 reads corresponding common configuration information from the host device 5, or utilizes common configuration information of the "HW group 1D" having been already stored and thereby, the robot controller 2 can be matched with a model of an object robot which is currently connected. After that, the same processing as a case that replacement of a robot controller of the same "HW group 1D" is detected is executed and thus, a robot controller of a different hardware identifier, in other words, of a different "HW group 1D" can be replaced and used. In other words, according to this embodiment, regarding a robot of a model of an "HW group 1D" whose common configuration information is stored in the host device or in a robot controller 2, the same robot controller can be connected with an arbitrary robot without being restricted for each model or for each the same mechanism.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A robot system comprising:
    a robot controller;
    an object robot which is an object to be controlled by the robot controller; and
    an upper-level device with which the robot controller is connected;
    wherein the object robot comprises a first storage part which stores a hardware identifier for identifying a mechanism of the object robot, individual discrimination data which discriminate the object robot as an individual, and device specific data including an individual difference parameter which is specific to the object robot;
    wherein a same hardware identifier is assigned to a different model of an object robot having a same mechanism as the object robot to be controlled by the robot controller;
    wherein the upper-level device comprises a template storage part which stores common configuration information of each of a plurality of the different hardware identifiers; and
    wherein the robot controller comprises:
        a second storage part which stores common configuration information corresponding to the hardware identifier and the individual discrimination data and the individual difference parameter of an object robot connected with the robot controller; and a control part configured to control the object robot connected with the robot controller based on hardware definition information comprising the common configuration information and the individual difference parameter;

wherein the control part collates the hardware identifier corresponding to the common configuration information stored in the second storage part and the hardware identifier assigned to the object robot and, in a case that the hardware identifier corresponding to the common configuration information stored in the second storage part and the hardware identifier assigned to the object robot are matched with each other, the control part collates the individual discrimination data stored in the first storage part and the individual discrimination data stored in the second storage part and, when the individual discrimination data stored in the first storage part and the individual discrimination data stored in the second storage part are not matched with each other, the control part creates hardware definition information of the object robot based on the common configuration information stored in the second storage part and the individual difference parameter read from the first storage part, and the control part controls the object robot by using the hardware definition information, and wherein in a case that the hardware identifier corresponding to the common configuration information stored in the second storage part and the hardware identifier assigned to the object robot are collated and not matched with each other, the control part reads the common configuration information corresponding to the hardware identifier assigned to the object robot from the template storage part and updates the common configuration information in the second storage part and creates the hardware definition information of the object robot by using the common configuration information after being updated, and the control part controls the object robot by using the created hardware definition information.

2. The robot system according to claim 1, wherein the control part collates the individual discrimination data read from the first storage part with the individual discrimination data having been already stored in the second storage part, and when a result of collation is matched, the control part controls the object robot by the hardware definition information having been already prepared without newly creating the hardware definition information.

3. The robot system according to claim 1, wherein the object robot comprises a robot main body comprising at least a manipulator and an attachment separately provided from the robot main body, hardware identifiers different from each other are assigned to the robot main body and the attachment, and the control part collates the hardware identifier for each of the robot main body and the attachment.

4. The robot system according to claim 3, wherein each of the robot main body and the attachment comprises the first storage part, the first storage part of the robot main body stores the individual discrimination data and the individual difference parameter of the robot main body, and the first storage part of the attachment stores the individual discrimination data and the individual difference parameter of the attachment.

5. The robot system according to claim 4, wherein individual discrimination data of the robot main body comprises data relating to a model of the robot main body, individual discrimination data of the attachment comprises data relating to a model of the attachment, the robot controller comprises a model configuration table in which allowable combinations between the model of the robot main body and the model of the attachment are described, and the control part issues a warning when a combination between the robot main body and the attachment which are connected with the robot controller is not described in the model configuration table.

6. The robot system according to claim 3, wherein the robot main body comprises the manipulator and a hand, the manipulator and the hand are assigned with hardware identifiers different from each other, and the control part collates the hardware identifier for each of the manipulator and the hand.

7. The robot system according to claim 6, wherein each of the manipulator and the hand comprises the first storage part, the first storage part of the manipulator stores the individual discrimination data and the individual difference parameter of the manipulator, and the first storage part of the hand stores the individual discrimination data and the individual difference parameter of the hand.

8. The robot system according to claim 7, wherein individual discrimination data of the manipulator comprises data relating to a model of the manipulator, individual discrimination data of the hand comprises data relating to a model of the hand, individual discrimination data of the attachment comprises data relating to a model of the attachment, the robot controller comprises a model configuration table in which allowable combinations between the model of the manipulator, the model of the hand and the model of the attachment are described, and the control part issues a warning when a combination between the manipulator, the hand and the attachment which are connected with the robot controller is not described in the model configuration table.

* * * * *